(12) United States Patent
Takimoto et al.

(10) Patent No.: US 7,176,663 B2
(45) Date of Patent: Feb. 13, 2007

(54) CONTROL CIRCUIT FOR DC/DC CONVERTER

(75) Inventors: Kyuichi Takimoto, Kasugai (JP);
Takashi Matsumoto, Kasugai (JP);
Akira Haraguchi, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/624,644

(22) Filed: Jul. 23, 2003

(65) Prior Publication Data

US 2004/0124815 A1 Jul. 1, 2004

(30) Foreign Application Priority Data

Aug. 22, 2002 (JP) ............... 2002-242422

(51) Int. Cl.
*G05F 1/618* (2006.01)
(52) U.S. Cl. .............. 323/224; 323/271; 323/282
(58) Field of Classification Search ............... 323/222, 323/224, 271, 282, 284, 287
See application file for complete search history.

(56) References Cited

U.S. PATENT DOCUMENTS

| | | | | |
|---|---|---|---|---|
| 4,862,364 A * | 8/1989 | Matsuda | | 701/31 |
| 5,627,460 A * | 5/1997 | Bazinet et al. | | 323/288 |
| 6,288,524 B1 * | 9/2001 | Tsujimoto | | 323/285 |
| 6,320,359 B1 * | 11/2001 | Nagaya et al. | | 323/224 |
| 6,396,250 B1 * | 5/2002 | Bridge | | 323/283 |
| 6,577,517 B2 * | 6/2003 | Jain et al. | | 363/89 |
| 6,603,671 B2 * | 8/2003 | Tokunaga et al. | | 363/17 |
| RE38,487 E * | 4/2004 | Isham et al. | | 323/224 |
| 2003/0231011 A1* | 12/2003 | Umemoto et al. | | 323/284 |
| 2004/0104714 A1* | 6/2004 | Nishimaki | | 323/282 |

FOREIGN PATENT DOCUMENTS

| JP | 2002-184696 | 6/2000 |
|---|---|---|
| JP | 2002-101655 | 4/2002 |

* cited by examiner

*Primary Examiner*—Gary L Laxton
(74) *Attorney, Agent, or Firm*—Armstrong, Kratz, Quintos, Hanson & Brooks, LLP

(57) ABSTRACT

A control circuit for controlling an output voltage of a DC/DC converter. The control circuit includes a pulse signal generation circuit which generates a pulse signal for controlling the output voltage of the DC/DC converter, and a drive signal generation circuit which generates first and second drive signals using the pulse signal such that a main switching element and a synchronous switching element are turned ON and OFF alternately at different timings. The drive signal generation circuit generates the first drive signal which has substantially the same pulse width as that of the pulse signal to improve ON-duty characteristics of the main switching element.

19 Claims, 6 Drawing Sheets

CONTROL CIRCUIT FOR DC/DC CONVERTER

CROSS-REFERENCE TO RELATED APPLICATIONS

This application is based upon and claims the benefit of priority from prior Japanese Patent Application No. 2002-242422, filed on Aug. 22, 2002, the entire contents of which are incorporated herein by reference.

BACKGROUND OF THE INVENTION

The present invention relates to a DC/DC converter, and, more particularly, to a synchronous rectification-type DC/DC converter used as a power supply for a variety of electronic devices and a control circuit for the converter.

Figure 1:
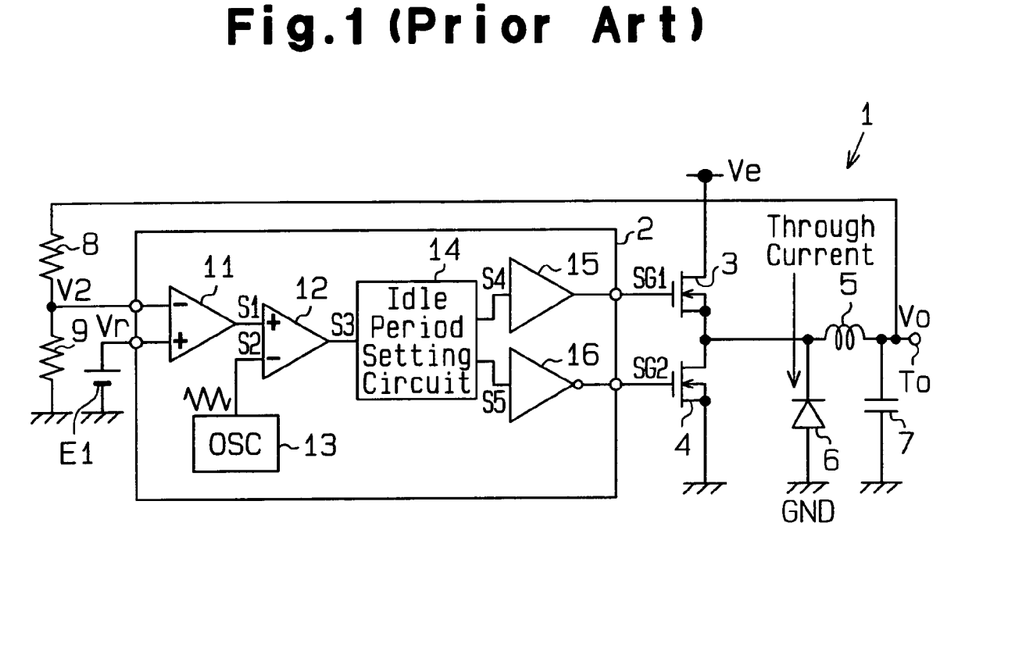
FIG. 1 is a schematic block diagram of a conventional DC/DC converter.

As shown in FIG. 1, a conventional synchronous rectification-type DC/DC converter 1 comprises a control circuit 2 formed on a single semiconductor integrated circuit substrate and seven elements 3 to 9 mounted externally.

A first drive signal SG1 of the control circuit 2 is supplied to the gate of the main switching element 3, which is an enhancement-type N-channel MOS transistor. The switching element 3 operates as a main switch for driving a load. The drain of the switching element 3 is supplied with a supply voltage Ve from a battery, while the source of the switching element 3 is connected to the drain of the synchronous switching element 4, which is an enhancement-type N-channel MOS transistor. The gate of the synchronous switching element 4 is supplied with a second drive signal SG2 of the control circuit 2, while the source thereof is connected to the ground GND.

A node between the main switching element 3 and the synchronous switching element 4 is connected via a choke coil 5 to an output terminal To of the DC/DC converter 1 and also through the fly-back diode 6 to the ground GND. The synchronous switching element 4 operates when the DC/DC converter 1 is flying back, thus reducing loss at the fly-back diode 6.

The output terminal To is connected via the smoothing capacitor 7 to the ground GND. The output terminal To, which outputs voltage Vo of the DC/DC converter 1, is connected to the load of a control unit such as a CPU (not shown). The choke coil 5 and the smoothing capacitor 7 constitute a smoothing circuit. The output voltage Vo is divided by the resistors 8 and 9, and a divided voltage V2 is fed back to the control circuit 2.

The control circuit 2 includes an error amplification circuit 11, a PWM comparison circuit 12, a triangular wave oscillation circuit 13, an idle period setting circuit 14, and first and second output circuits 15 and 16.

The error amplification circuit 11 compares the divided voltage V2 supplied to an inverting input terminal and a reference voltage Vr (set voltage) supplied to a non-inverting input terminal from a reference power supply E1 and amplifies a differential voltage between the two, thus generating an error signal S1.

The PWM comparison circuit 12 compares the error signal S1 supplied to the non-inverting input terminal from the error amplification circuit 11 and a triangular wave signal S2 supplied to the inverting input terminal from the triangular wave oscillation circuit 13, to generate a pulse signal S3 having a low (L) level in a period for which the triangular wave signal S2 is higher in level than the error signal S1 and the pulse signal S3 having a high (H) level in a period opposite to it.

Based on the pulse signal S3 supplied from the PWM comparison circuit 12, the idle period setting circuit 14 generates first and second control signals S4 and S5 such that the main switching element 3 and the synchronous switching element 4 are turned ON and OFF substantially complementarily and also such that they are not turned ON simultaneously (that is, the switching elements 3 and 4 are turned ON and OFF alternately at different timings). A period in which the switching elements 3 and 4 are turned OFF simultaneously is referred to as a synchronous rectification idle period (hereinafter called idle period). The idle period is set to prevent the system from being destroyed by an excessive current which would flow through the switching elements 3 and 4 if the main switching elements 3 and 4 were turned ON simultaneously.

The first output circuit 15 amplifies the first control signal S4 supplied from the idle period setting circuit 14, to generate a first drive signal SG1 supplied to the main switching element 3. The second output circuit 16 amplifies the second control signal S5 supplied from the idle period setting circuit 14, to generate a second drive signal SG2 supplied to the synchronous switching element 4.

Figure 2:
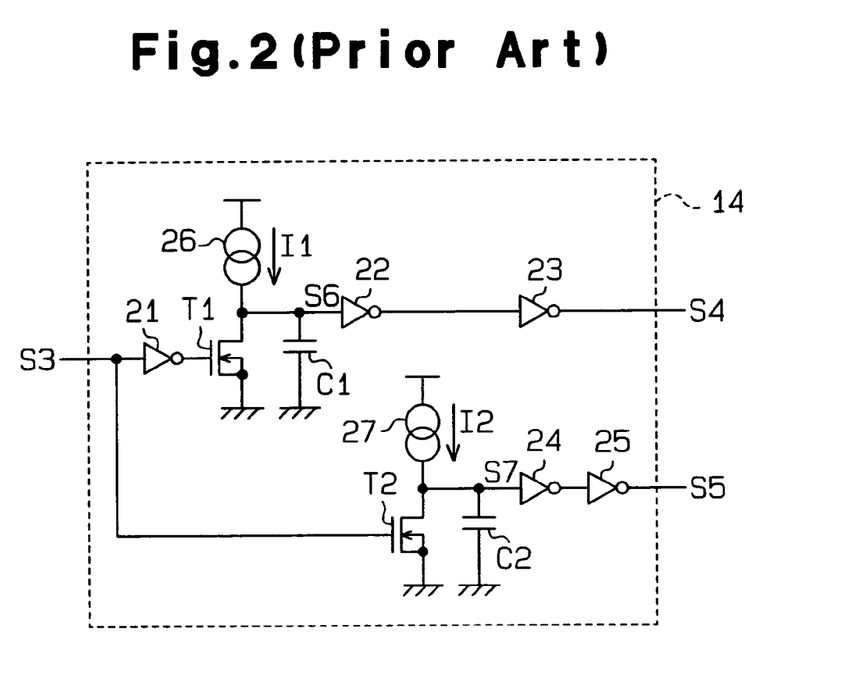
FIG. 2 is a schematic circuit diagram of an idle period setting circuit of the DC/DC converter of FIG. 1.

As shown in FIG. 2, the idle period setting circuit 14 includes five inverter circuits 21 to 25, two transistors T1 and T2, two power supplies 26 and 27, and two capacitors C1 and C2.

The pulse signal S3 is supplied to the inverter circuit 21, which in turn supplies an inverted signal of the pulse signal S3 to the gate of the N-channel MOS transistor T1. The source of the transistor T1 is connected to the ground GND and the drain thereof is connected to the current source 26. A node between the transistor T1 and the current source 26 is connected via the inverter circuit 22 to the inverter circuit 23, which outputs the first control signal S4, and also to the ground GND via the capacitor C1.

Figure 3:
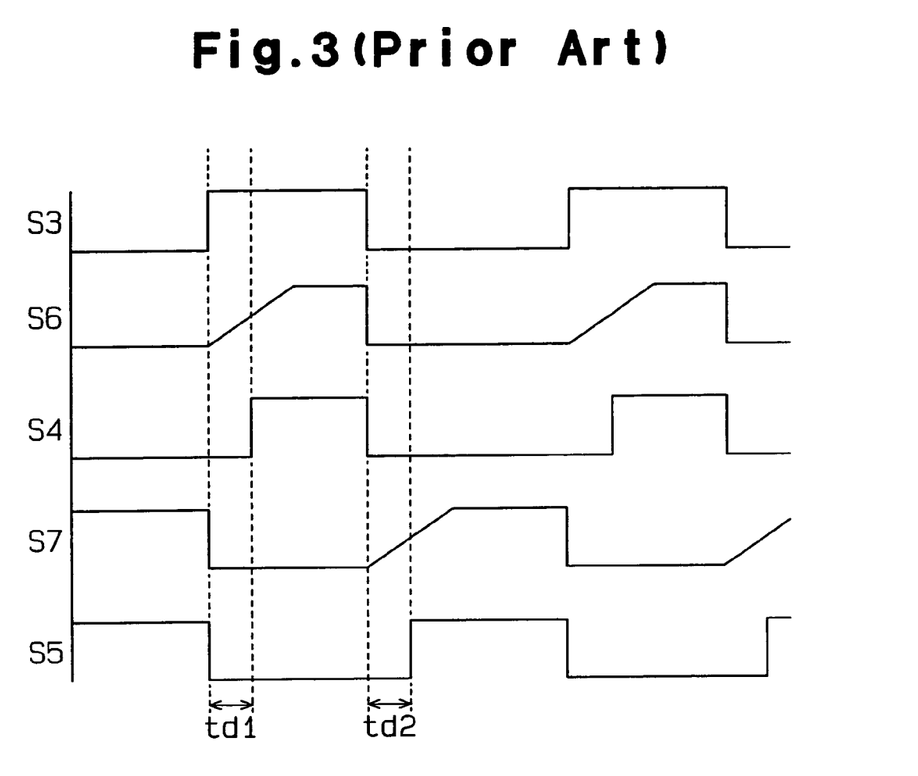
FIG. 3 is an operating waveform diagram of the idle period setting circuit of FIG. 2.

As shown in FIG. 3, when the pulse signal S3 rises, an input signal S6 of the inverter circuit 22 also rises in accordance with a current I1 from the current source 26 and a capacitance of the capacitor C1. Subsequently, when the pulse signal S3 falls, the transistor T1 is turned ON, thus causing the input signal S6 to fall rapidly. When the voltage of the input signal S6 exceeds a threshold voltage Vth of the inverter circuit 22, the inverter circuit 22 inverts the input signal S6. Therefore, the first control signal S4 rises as delayed with respect to the rising timing of the pulse signal S3 by time td1 which corresponds to charging time of the capacitor C1 and falls substantially at the same time as the pulse signal S3 falls. The delay time td1 is obtained by:

$$td1 = Vth * C1 / I1$$

The pulse signal S3 is supplied to the gate of the N-channel MOS transistor T2. The source of the transistor T1 is connected to the ground GND and the drain thereof is connected to the current source 27. A node between the transistor T2 and the current source 27 is connected via the inverter circuit 24 to the inverter circuit 25, which outputs the second control signal S5, and also to the ground GND via the capacitor C2.

As shown in FIG. 3, when the pulse signal S3 rises, the transistor T2 is turned ON, thus causing an input signal S7 of the inverter circuit 24 to fall rapidly. Subsequently, when the pulse signal S3 rises, the input signal S7 rises in accordance with a current I2 from the current source 27 and a capacitance of the capacitor C2. When the voltage of the input signal S7 exceeds a threshold voltage Vth of the inverter circuit 24, the inverter circuit 24 inverts the input signal S7. Therefore, the second control signal S5 falls substantially at the same time as the pulse signal S3 rises and rises as delayed with respect to the rising timing of the pulse signal S3 by delay time td2 which corresponds to charging time of the capacitor C2. The delay time td2 is obtained by:

$$td2=Vth*C2/I2$$

Figure 4:
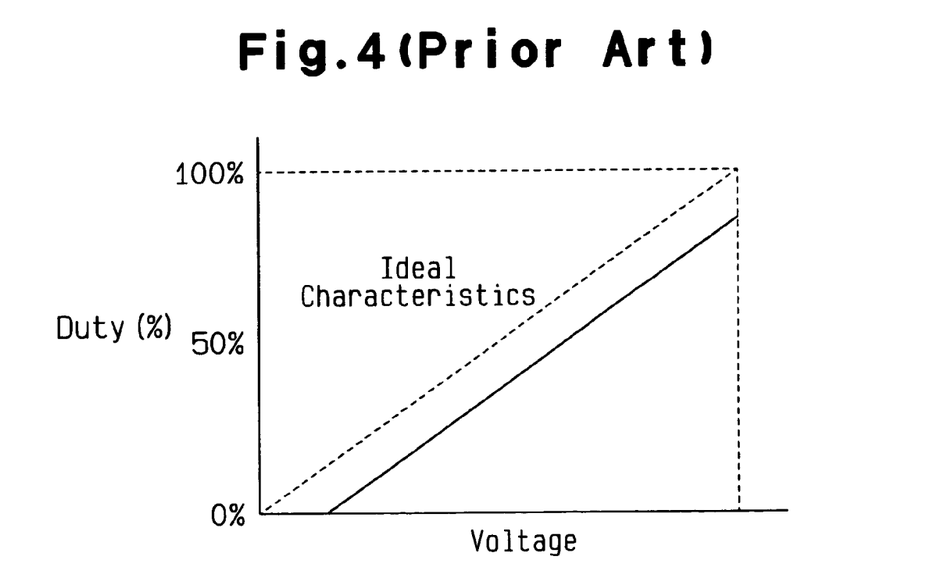
FIG. 4 is a graph for showing a relationship between a voltage of an error signal and an ON-duty ratio in the DC/DC converter of FIG. 1.

Preferably the DC/DC converter 1 operates on a low supply voltage in order to reduce power consumption. The idle period setting circuit 14, however, generates the first control signal S4 which has a pulse width smaller than that of the pulse signal S3 by the delay time td1. Accordingly, as shown in FIG. 4, an ON-duty ratio of the first control signal S4 with respect to the voltage of the error signal S1 becomes smaller than that of ideal characteristics. Therefore, it is impossible to set the duty ratio of the first control signal S4 (i.e., the first drive signal SG1) to a high value (for example, a value in the vicinity of 100%). For this reason, in the conventional DC/DC converter 1, it is difficult to lower the supply voltage to reduce the power consumption.

SUMMARY OF THE INVENTION

In a first aspect of the present invention, a control circuit for controlling an output voltage of a DC/DC converter is provided. The DC/DC converter includes a main switching element and a synchronous switching element. The control circuit includes a pulse signal generation circuit which generates a pulse signal for controlling the output voltage of the DC/DC converter based on the output voltage. A drive signal generation circuit is connected to the pulse signal generation circuit. The drive signal generation circuit generates first and second drive signals using the pulse signal for respective supply to the main switching element and the synchronous switching element such that the main switching element and the synchronous switching element are turned ON and OFF alternately at different timings due to receiving the first and second drive signals. The drive signal generation circuit generates the first drive signal such that the first drive signal has substantially the same pulse width as that of the pulse signal.

In a second aspect of the present invention, a control circuit for controlling an output voltage of a DC/DC converter is provided. The DC/DC converter includes a main switching element and a synchronous switching element. The control circuit includes an error amplification circuit which compares the output voltage of the DC/DC converter and a reference voltage to generate an error signal. A comparison circuit is connected to the error amplification circuit. The comparison circuit compares the error signal and a triangular wave signal to generate a pulse signal having a pulse width proportional to the voltage of the error signal. A drive signal generation circuit is connected to the comparison circuit. The drive signal generation circuit generates first and second drive signals using the pulse signal for respective supply to the main switching element and the synchronous switching element such that the main switching element and the synchronous switching element are turned ON and OFF alternately at different timings due to receiving the first and second drive signals. The drive signal generation circuit generates the first drive signal such that the first drive signal has substantially the same pulse width as that of the pulse signal.

In a third aspect of the present invention a DC/DC converter is provided. The DC/DC converter includes a main switching element and a synchronous switching element connected in series to the main switching element. A smoothing circuit is connected to a node between the main switching element and the synchronous switching element. The smoothing circuit generates an output voltage. A control circuit controls the output voltage by supplying a first drive signal to the main switching element and supplying a second drive signal to the synchronous switching element. The control circuit includes a pulse signal generation circuit which generates a pulse signal for controlling the output voltage based on the output voltage. A drive signal generation circuit is connected to the pulse signal generation circuit. The drive signal generation circuit generates the first and second drive signals by using the pulse signal such that the main switching element and the synchronous switching element are turned ON and OFF alternately at different timings. The drive signal generation circuit generates the first drive signal such that the first drive signal has substantially the same pulse width as that of the pulse signal.

In a fourth aspect of the present invention, a method for controlling an output voltage of a DC/DC converter is provided. The DC/DC converter includes a main switching element and a synchronous switching element. The method includes generating a pulse signal for controlling the output voltage of the DC/DC converter based on the output voltage, generating a first drive signal which has substantially the same pulse width as that of the pulse signal and supplying the first drive signal to the main switching element, and generating a second drive signal using the pulse signal and the first drive signal and supplying the second drive signal to the synchronous switching element such that the main switching element and the synchronous switching element are turned ON and OFF alternately at different timings.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 5:
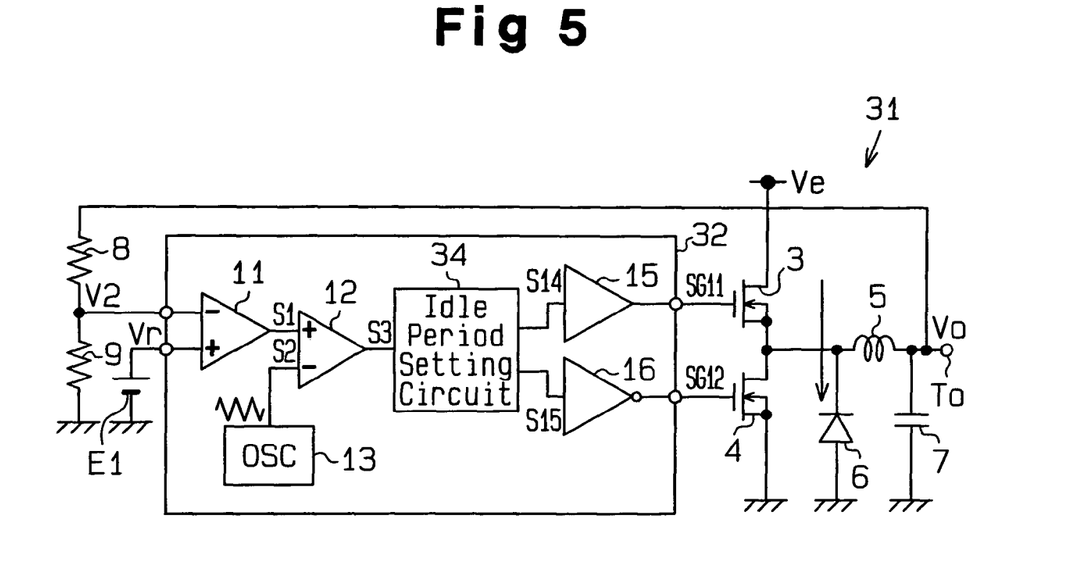
FIG. 5 is a schematic block diagram of a DC/DC converter according to one embodiment of the present invention.

As shown in FIG. 5, a DC/DC converter 31 according to an embodiment of the present invention includes a control circuit 32 formed on a single semiconductor integrated circuit substrate and seven elements externally mounted, that is, a main switching element 3, a synchronous switching element 4, a choke coil 5, a fly-back diode 6, a smoothing capacitor 7, and resistors 8 and 9. The choke coil 5 and the smoothing capacitor 7 constitute a smoothing circuit.

The resistors 8 and 9 divide an output voltage Vo at an output terminal To, to supply a divided voltage V2 to the control circuit 32. Based on the divided voltage V2, the control circuit 32 generates a first drive signal SG11 supplied to the main switching element 3 and a second drive signal SG12 supplied to the synchronous switching element 4.

The control circuit 32 includes an error amplification circuit 11, a PWM comparison circuit 12, a triangular wave oscillation circuit 13, an idle period setting circuit 34, and the first and second output circuits 15 and 16.

The error amplification circuit 11 compares the divided voltage V2 supplied to an inverting input terminal and a reference voltage Vr supplied to a non-inverting input terminal from a reference power supply E1 and amplifies a differential voltage between the two, thus generating an error signal S1.

The PWM comparison circuit 12 compares the error signal S1 supplied to the non-inverting input terminal from the error amplification circuit 11 and the triangular wave signal S2 supplied to the inverting input terminal from the triangular wave oscillation circuit 13, to generate a pulse signal S3 having an L level in a period for which a triangular wave signal S2 is higher in level than the error signal S1 and the pulse signal S3 having an H level in a period opposite to it.

The idle period setting circuit 34 receives the pulse signal S3 from the PWM comparison circuit 12 and generates a first control signal S14 which has substantially the same pulse width as that of the pulse signal S3. Furthermore, based on the pulse signal S3 and the first control signal S14, the idle period setting circuit 34 generates a second control signal S15 such that the main switching element 3 and the synchronous switching element 4 are turned ON and OFF substantially complementarily and also such that they are not turned ON simultaneously (that is, the switching elements 3 and 4 are turned ON and OFF alternately at different timings). An idle period in which the switching elements 3 and 4 are not turned ON simultaneously is set in order to prevent the system from being destroyed by an excessive current which would flow if the switching elements 3 and 4 were turned ON simultaneously.

The first output circuit 15 amplifies the first control signal S14 supplied from the idle period setting circuit 34 and generates the first drive signal SG11 supplied to the main switching element 3. The second output circuit 16 amplifies the second control signal S15 supplied from the idle period setting circuit 34 and generates a second drive signal SG12 supplied to the synchronous switching element 4.

Figure 6:
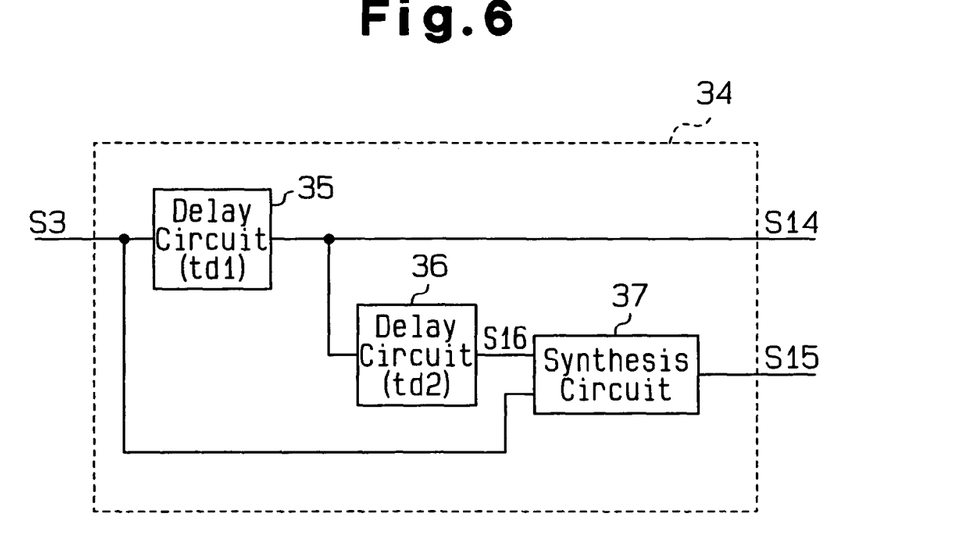
FIG. 6 is a schematic block diagram of an idle period setting circuit of the DC/DC converter of FIG. 5.

As shown in FIG. 6, the idle period setting circuit 34 includes first and second delay circuits 35 and 36 and a synthesis circuit 37. The first delay circuit 35 delays the pulse signal S3 by a predetermined delay time td1 to generate the first control signal S14 having substantially the same pulse width as that of the pulse signal S3 as shown in FIG. 7.

Figure 7:
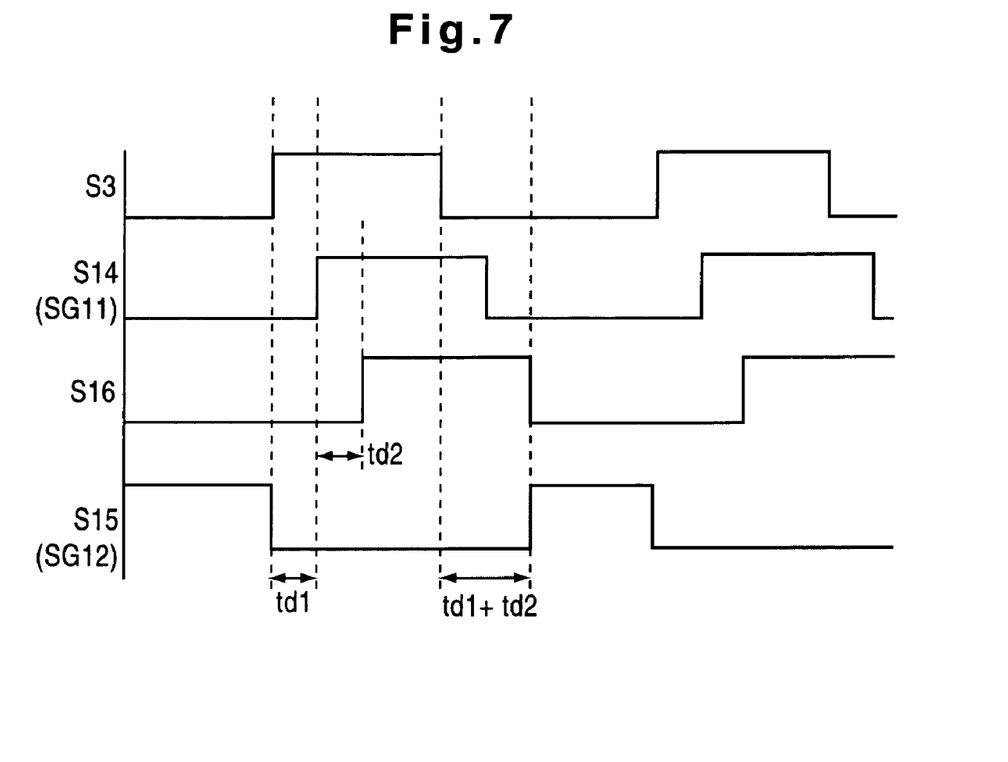
FIG. 7 is an operating waveform diagram of the idle period setting circuit of FIG. 6.

The second delay circuit 36 receives the first control signal S14 from the first delay circuit 35 and delays the first control signal S14 by a predetermined delay time td2 to generate a delayed signal S16 having substantially the same pulse width as that of the first control signal S14 (pulse signal S3) as shown in FIG. 7.

The synthesis circuit 37 receives the pulse signal S3 and the delayed signal S16 and logically synthesizes the pulse signal S3 with the delayed signal S16 to generate the second control signal S15 such that the main switching element 3 and the synchronous switching element 4 are turned ON and OFF substantially complementarily and also such that these two switching elements 3 and 4 are not turned ON simultaneously. The second control signal S15 has a larger pulse width than that of the first control signal S14.

Figure 9:
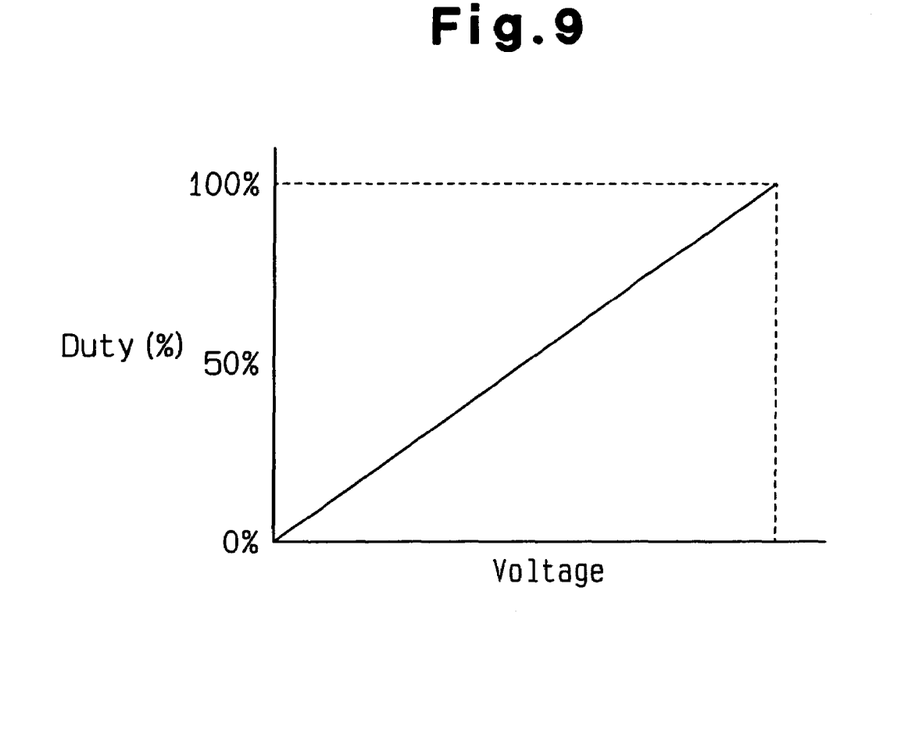
FIG. 9 is a graph for showing a relationship between a voltage of an error signal and an ON-duty ratio in the DC/DC converter of FIG. 5.

In such a manner, the idle period setting circuit 34 generates the first control signal S14 having substantially the same pulse width as that of the pulse signal S3. As shown in FIG. 9, therefore, an ON-duty ratio of the first control signal S14 with respect to a voltage of the error signal S1, which is supplied to the PWM comparison circuit 12, is substantially consistent with that of the ideal characteristics. It is thus possible to set the duty ratio of the first control signal S14 (that is, first drive signal SG11) in the vicinity of 100%, for example.

Figure 8:
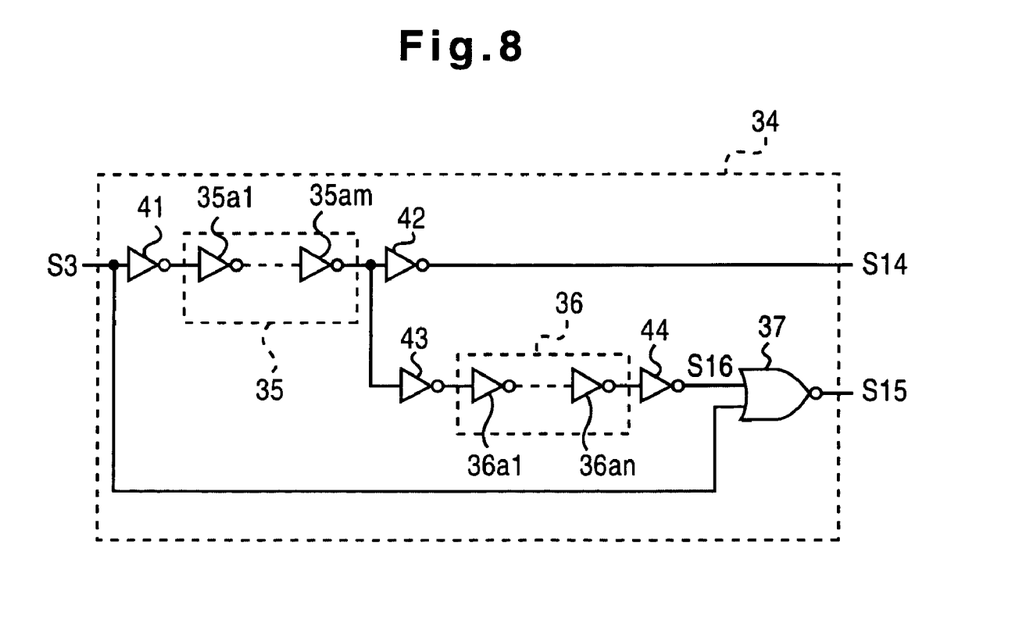
FIG. 8 is a schematic circuit diagram of the idle period setting circuit of FIG. 6.

As shown in FIG. 8, the first delay circuit 35 of the idle period setting circuit 34 includes a plurality (m number) of serially connected inverter circuits 35a1 to 35am. The pulse signal S3, which is supplied to the first delay circuit 35, is delayed by the delay time td1 which is determined by m which indicates the number of the inverter circuits 35a1 to 35am. The second delay circuit 36 includes a plurality (n number) of serially connected inverter circuits 36a1 to 36an. The first control signal S14, which is supplied to the second delay circuit 36, is delayed by the delay time td2 which is determined by n which indicates the number of the inverter circuits 36a1 to 36an. The synthesis circuit 37 is a NOR circuit which performs a neither-nor operation on the pulse signal S3 and the delay signal S16 to generate the second control signal S15.

The idle period setting circuit 34 includes inverter circuits 41 to 44 which are provided so that a logical level of the pulse signal S3 may match that of the first and second control signals S14 and S15 in accordance with the circuit configurations of the first and second delay circuit 35 and 36 and the synthesis circuit 37. For example, if an even number of the inverters are included in the first delay circuit 35, a path, to which the pulse signal S3 is supplied and from which the first control signal S14 is output, is provided with an even number of the inverter circuits. Then, the inverter circuits are inserted in accordance with how the first and second delay circuits 35 and 36 are interconnected.

The DC/DC converter 31 according to the present embodiment has the following advantages.

(1) The idle period setting circuit 34 delays the pulse signal S3 supplied from the PWM comparison circuit 12 and generates the first control signal S14 which has substantially the same pulse width as that of the pulse signal S3. The main switching element 3 is turned ON and OFF by the first drive signal SG11 which has a pulse width that corresponds to an ideal duty ratio which is set in accordance with the output voltage Vo. As a result, the duty ratio of the first drive signal SG11 can be set to 100% to operate the DC/DC converter 31 on a low supply voltage, thus decreasing electric power consumption.

(2) The synthesis circuit 37 of the idle period setting circuit 34 logically synthesizes the pulse signal S3 and the delayed signal S16 of the first control signal S14 and generates the second control signal S15. The synchronous switching element 4 is securely maintained OFF while the main switching element 3 is ON. Therefore, the idle period is securely set.

Figure 10:
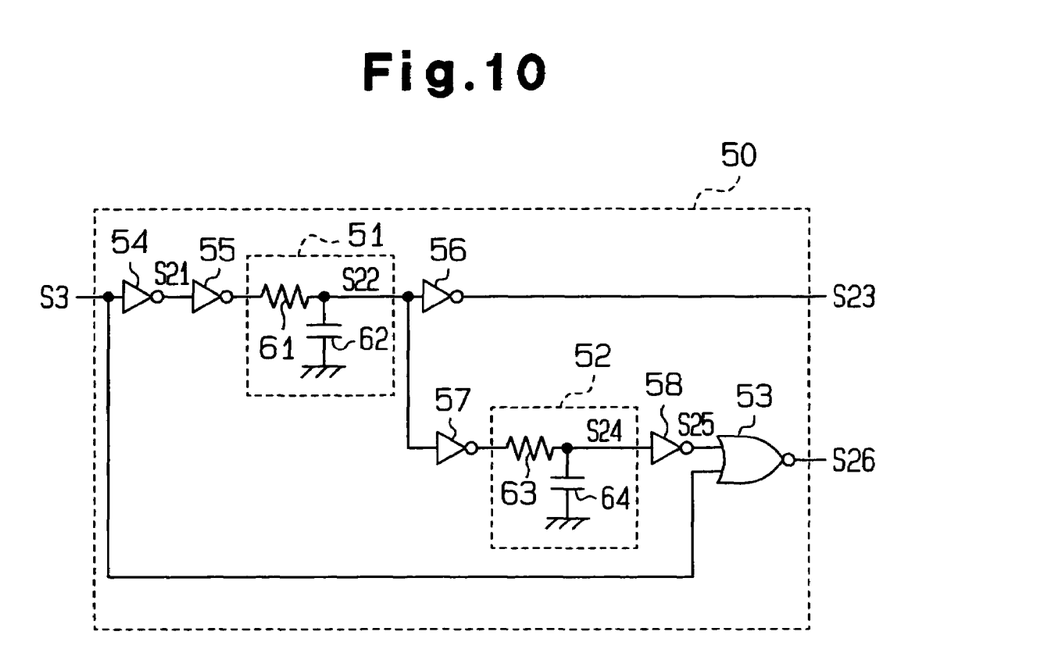
FIG. 10 is a schematic circuit diagram of an alternative example of an idle period setting circuit.
Figure 11:
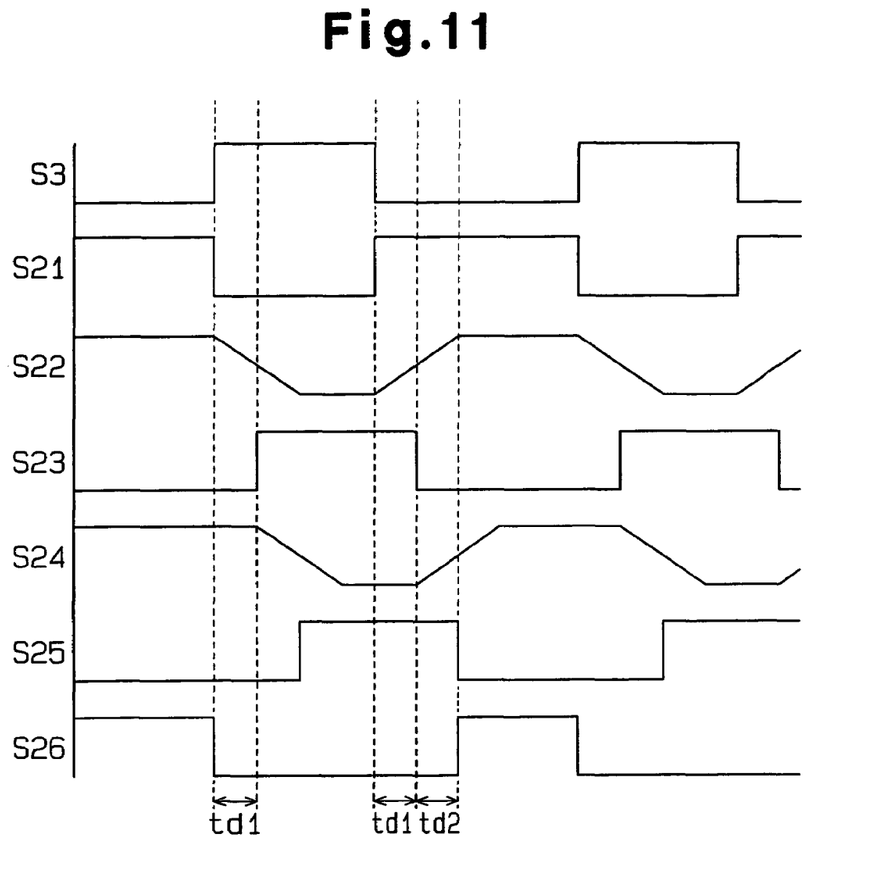
FIG. 11 is an operating waveform diagram of the idle period setting circuit of FIG. 10.

It should be apparent to those skilled in the art that the present invention may be embodied in many other specific forms without departing from the spirit or scope of the invention. Particularly, it should be understood that the invention may be embodied in the following forms.

a) The idle period setting circuit 34 may be replaced by an idle period setting circuit 50 such as shown in FIG. 10. FIG. 11 shows various signal waveforms used in the idle period setting circuit 50.

The idle period setting circuit 50 includes first and second delay circuits 51 and 52, a synthesis circuit 53, and inverter circuits 54 to 58. The first delay circuit 51 is an integrating circuit which includes a resistor 61 connected between the inverters 55 and 56, and a capacitor 62 connected between a node, between the resistor 61 and the inverter 56, and the ground. The integrating circuit generates an output signal whose through rate corresponding to the rising and falling timings of an input signal is delayed by a time constant, which output signal in turn delays the rising and falling timings of an output signal of the next-stage inverter circuit 56. In such a manner, the inverter circuit 56 generates a first control signal S23 which is delayed with respect to the pulse signal S3 by the delay time td1 and which has substantially the same pulse width as that of the pulse signal S3. The delay time td1 is determined by a resistance value R2 of the resistor 61, a capacitance value C2 of the capacitor 62, and a threshold value Vth1 of the inverter circuit 56 as follows:

$$td1 = C2 \times R2 \times ln\,(Vth1)$$

The second delay circuit 52 is an integrating circuit which includes a resistor 63 connected between the inverters 57 and 58 and a capacitor 64 connected between a node that is between the resistor 63 and the inverter 58, and the ground. The integrating circuit generates an output signal whose through rate corresponding to the rising and falling timings of an input signal is delayed by a time constant, which output signal in turn delays the rising and falling timings of an output signal of the next-stage inverter circuit 58. In such a manner, the inverter circuit 58 generates a delayed signal S25 which is delayed with respect to a first control signal S23 by the delay time td2 and which has substantially the same pulse width as that of the pulse signal S3. The delay time td2 is determined by a resistance value R3 of the resistor 63, a capacitance value C3 of the capacitor 64, and a threshold value Vth2 of the inverter circuit 56 as follows:

$$td2 = C3 \times R3 \times ln\,(Vth2)$$

Figure 12A:
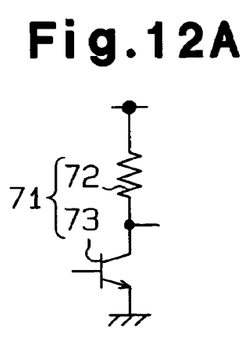
FIGS. 12A to 12C are schematic circuit diagrams of inverter circuits used in the idle period setting circuit of FIG. 8 or 10.
Figure 12B:
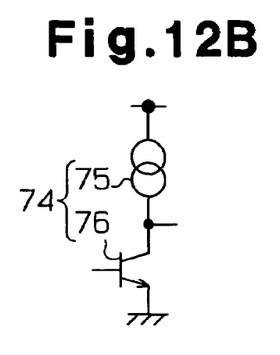
Figure 12C:
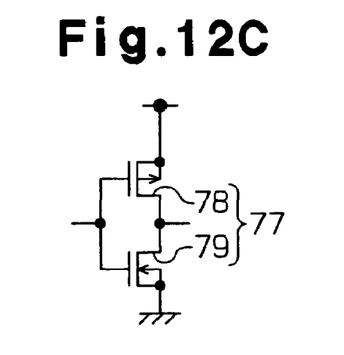

The synthesis circuit 53 is a NOR circuit which performs a neither-nor operation on the pulse signal S3 and the delayed signal S25 and generates the second control signal S26. The first output circuit 15 receives the first control signal S23 and generates the first drive signal SG11, while the second output circuit 16 receives the second control signal 26 and generates the second drive signal SG12.

b) The inverter circuits 35a1 to 35am, 36a1 to 36an, 41 to 44, and 54 to 58 each may be replaced by an inverter circuit 71, 74, or 77 shown in FIGS. 12A to 12C. The inverter circuit 71 of FIG. 12A includes a resistor 72 and an NPN transistor 73. The inverter circuit 74 of FIG. 12B includes a current source 75 and an NPN transistor 76. If these inverter circuits 71 and 74 are applied to the inverter circuits 54 to 58 and the synthesis circuit 53 of the idle period setting circuit 50 of FIG. 10, the inverter circuits 54 to 58 and the synthesis circuit 53 can be formed by the same process as that for the first and second delay circuits 51 and 52.

The inverter circuit 77 of FIG. 12C is a CMOS inverter circuit which is comprised of a P-channel MOS transistor 78 and an N-channel MOS transistor 79. If this inverter circuit 77 is applied to the idle period setting circuits 34 and 50, power consumption can be reduced.

c) The switching elements 3 and 4 and the voltage dividing resistors 8 and 9 may be formed together with the control circuit 32 on a single semiconductor integrated circuit substrate.

Therefore, the present examples and embodiments are to be considered as illustrative and not restrictive and the invention is not to be limited to the details given herein, but may be modified within the scope and equivalence of the appended claims.

What is claimed is:

1. A control circuit for controlling an output voltage of a DC/DC converter, wherein the DC/DC converter includes a main switching element and a synchronous switching element, the control circuit comprising:

a pulse signal generation circuit which generates a pulse signal for controlling the output voltage of the DC/DC converter based on the output voltage; and a drive signal generation circuit connected to the pulse signal generation circuit in which the drive signal generation circuit generates first and second drive signals using the pulse signal for respective supply to the main switching element and the synchronous switching element such that the main switching element and the synchronous switching element are turned ON and OFF alternately at different timings as a result of receiving the first and second drive signals, and the drive signal generation circuit generates the first drive signal such that the first drive signal has the same pulse width as that of the pulse signal, wherein the drive signal generation circuit generates the second drive signal having a pulse width greater than that of the first drive signal when the first drive signal is supplied to the main switching element, and wherein the drive signal generation circuit includes:

a first delay circuit which generates the first drive signal by delaying the pulse signal;

a second delay circuit connected to the first delay circuit, the second delay circuit generating a delayed signal by delaying the first drive signal; and a synthesis circuit connected to the second delay circuit, and the synthesis circuit generating the second drive signal by synthesizing the pulse signal with the delayed signal.

2. The control circuit according to claim 1, wherein the drive signal generation circuit generates the second drive signal such that the second drive signal has a larger pulse width than the first drive signal using the pulse signal and the first drive signal.

3. The control circuit according to claim 1, wherein the first and second delay circuits each includes a plurality of inverter circuits.

4. The control circuit according to claim 1, wherein the first and second delay circuits each includes an integrating circuit having a resistor and a capacitor.

5. The control circuit according to claim 1, wherein the synthesis circuit includes a NOR circuit.

6. A control circuit for controlling an output voltage of a DC/DC converter, wherein the DC/DC converter includes a main switching element and a synchronous switching element, the control circuit comprising:

an error amplification circuit which compares the output voltage of the DC/DC converter and a reference voltage to generate an error signal;

a comparison circuit connected to the error amplification circuit in which the comparison circuit compares the error signal and a triangular wave signal to generate a pulse signal having a pulse width proportional to the voltage of the error signal; and a drive signal generation circuit connected to the comparison circuit, the drive signal generation circuit generating first and second drive signals using the pulse signal for respective supply to the main switching element and the synchronous switching element such that the main switching element and the synchronous switching element are turned ON and OFF alternately at different timings due to receiving the first and second drive signals, and the drive signal generation circuit generating the first drive signal such that the first drive signal has the same pulse width as that of the pulse signal, wherein the drive signal generation circuit generates the second drive signal having a pulse width greater than that of the first drive signal when the first drive signal is supplied to the main switching element, and wherein the drive signal generation circuit includes:

a first delay circuit which generates the first drive signal by delaying the pulse signal;

a second delay circuit connected to the first delay circuit, the second delay circuit generating a delayed signal by delaying the first drive signal; and a synthesis circuit connected to the second delay circuit, the synthesis circuit generating the second drive signal by synthesizing the pulse signal with the delayed signal.

7. The control circuit according to claim 6, wherein the drive signal generation circuit generates the first drive signal by delaying rising and falling of the pulse signal.

8. The control circuit according to claim 6, wherein the drive signal generation circuit generates a delayed signal by delaying rising and falling of the first drive signal and generates the second drive signal by synthesizing the delayed signal with the pulse signal.

9. The control circuit according to claim 6, wherein the first and second delay circuits each includes a plurality of inverter circuits.

10. The control circuit according to claim 6, wherein the first and second delay circuits each includes an integrating circuit having a resistor and a capacitor.

11. The control circuit according to claim 6, wherein the synthesis circuit includes a NOR circuit.

12. A DC/DC converter comprising:

a main switching element;

a synchronous switching element connected in series to the main switching element;

a smoothing circuit connected to a node between the main switching element and the synchronous switching element, the smoothing circuit generating an output voltage; and a control circuit which controls the output voltage by supplying a first drive signal to the main switching element and supplying a second drive signal to the synchronous switching element, the control circuit including:

a pulse signal generation circuit which generates a pulse signal for controlling the output voltage based on the output voltage; and a drive signal generation circuit connected to the pulse signal generation circuit, the drive signal generation circuit generating the first and second drive signals by using the pulse signal such that the main switching element and the synchronous switching element are turned ON and OFF alternately at different timings, and the drive signal generation circuit generating the first drive signal such that the first drive signal has the same pulse width as that of the pulse signal, wherein the drive signal generation circuit generates the second drive signal having a pulse width greater than that of the first drive signal when the first drive signal is supplied to the main switching element, and wherein the drive signal generation circuit includes:

a first delay circuit which generates the first drive signal by delaying the pulse signal;

a second delay circuit connected to the first delay circuit, the second delay circuit generating a delayed signal by delaying the first drive signal; and a synthesis circuit connected to the second delay circuit, the synthesis circuit generating the second drive signal by synthesizing the pulse signal with the delayed signal.

13. The DC/DC converter according to claim 12, wherein the drive signal generation circuit generates the second drive signal having a larger pulse width than the first drive signal using the pulse signal and the first drive signal.

14. The DC/DC converter according to claim 12, wherein the drive signal generation circuit includes:

a first delay circuit which generates the first drive signal by delaying the pulse signal;

a second delay circuit connected to the first delay circuit, the second delay circuit generating a delayed signal by delaying the first drive signal; and a synthesis circuit connected to the second delay circuit, and the synthesis circuit generating the second drive signal by synthesizing the pulse signal and the delayed signal.

15. The DC/DC converter according to claim 14, wherein the first and second delay circuits each includes a plurality of inverter circuits.

16. The DC/DC converter according to claim 12, wherein the first and second delay circuits each include an integrating circuit which having a resistor and a capacitor.

17. The DC/DC converter according to claim 12, wherein the synthesis circuit includes a NOR circuit.

18. The DC/DC converter according to claim 12, wherein the pulse signal generation circuit includes:

an error amplification circuit which compares the output voltage and a reference voltage to generate an error signal; and a comparison circuit connected to the error amplification circuit, and the comparison circuit comparing the error signal and a triangular wave signal to generate a pulse signal having a pulse width proportional to the voltage of the error signal.

19. A method for controlling an output voltage of a DC/DC converter, wherein the DC/DC converter includes a main switching element and a synchronous switching element, the method comprising:

generating a pulse signal for controlling the output voltage of the DC/DC converter based on the output voltage;

generating a first drive signal which has the same pulse width as that of the pulse signal by delaying the pulse signal and supplying the first drive signal to the main switching element;

generating a delayed signal by delaying the first drive signal; and generating a second drive signal by synthesizing the pulse signal and the delayed signal and supplying the second drive signal to the synchronous switching element such that the main switching element and the synchronous switching element are turned ON and OFF alternately at different timings and the second drive signal has a pulse width greater than that of the first drive signal when the first drive signal is supplied to the main switching element.

* * * * *